United States Patent
Fan et al.

(10) Patent No.: US 12,433,214 B1
(45) Date of Patent: Oct. 7, 2025

(54) APPLICATION OF ZM00001D012005 GENE IN REGULATING STARCH CONTENT OF MAIZE KERNELS

(71) Applicant: Institute of Food Crops, Yunnan Academy of Agricultural Sciences, Yunnan (CN)

(72) Inventors: Xingming Fan, Yunnan (CN); Xiaoping Yang, Yunnan (CN); Fuyan Jiang, Yunnan (CN); Xingfu Yin, Yunnan (CN); Yaqi Bi, Yunnan (CN)

(73) Assignee: Institute of Food Crops, Yunnan Academy of Agricultural Sciences, Kunming (CN)

( * ) Notice: Subject to any disclaimer, the term of this patent is extended or adjusted under 35 U.S.C. 154(b) by 0 days.

(21) Appl. No.: 19/193,666

(22) Filed: Apr. 29, 2025

(30) Foreign Application Priority Data

Aug. 22, 2024 (CN) .......................... 202411157001.7

(51) Int. Cl.
*A01H 1/04* (2006.01)
*A01H 1/00* (2006.01)
*C12Q 1/6895* (2018.01)

(52) U.S. Cl.
CPC .............. *A01H 1/045* (2021.01); *A01H 1/102* (2021.01); *C12Q 1/6895* (2013.01); *C12Q 2600/13* (2013.01)

(58) Field of Classification Search
CPC .................................................... A01H 1/045
See application file for complete search history.

(56) References Cited

PUBLICATIONS

Predicted: *Zea mays* Putative histidine kinase family protein (LOC100274238), transcript variant X1, misc_RNA, with a GenBank Accession No. XR_004549249, ver. XR_004549249.2, published Sep. 1, 2020. (Year: 2020).*
Fejér et al., 2022, Effects of some agronomic practices on the quality of starch content of maize grains, Agronomy Research 20(1): 124-133. (Year: 2022).*
Milašinović-Šeremešić et al., 2021, Starch composition related to physical traits in maize kernel, Journal on Processing and Energy in Agriculture 25 (2): 78-81. (Year: 2021).*
Liu et al., 2016, Genome-wide association study identifies candidate genes for starch content regulation in maize kernels, Frontiers in Plant Science 7(1046): 1-8. (Year: 2016).*
"*Zea mays* cultivar B73 chromosome 8, whole genome shotgun sequence", CM000784.4, Ware, D., GenBank, pp. 1-13, Feb. 17, 2017.

* cited by examiner

*Primary Examiner* — Bratislav Stankovic

(57) ABSTRACT

The disclosure relates to the field of molecular marker-assisted breeding of maize, and specifically an application of a Zm00001d012005 gene in regulating starch content of maize kernels. Specifically, an application of a gene related to starch content of maize kernels in molecular marker-assisted breeding of maize is provided in the disclosure. A sequence of the Zm00001d012005 gene is as shown in SEQ ID NO: 1. In the disclosure, genome-wide association study (GWAS) analysis and genetic linkage analysis are utilized to co-localize SNP_166371888 which is on chromosome 8 and significantly associated with kernel starch content, and a functional gene Zm00001d012005 that regulates the kernel starch content is further identified. The gene Zm00001d012005 can explain 10.19% of phenotypic variation in the kernel starch content.

1 Claim, 17 Drawing Sheets

Specification includes a Sequence Listing.

APPLICATION OF ZM00001D012005 GENE IN REGULATING STARCH CONTENT OF MAIZE KERNELS

CROSS-REFERENCE TO RELATED APPLICATION

This application claims priority of Chinese Patent Application No. 202411157001.7, filed on Aug. 22, 2024, the entire contents of which are incorporated herein by reference.

TECHNICAL FIELD

The disclosure relates to the field of molecular marker-assisted breeding of maize, and specifically relates to an application of a Zm00001d012005 gene in regulating starch content of maize kernels.

REFERENCE TO A SEQUENCE LISTING SUBMITTED VIA EFS-WEB

The content of the xml file of the sequence listing named "HKIP-US-1-1353-23_sequence_listing" which is 8, 311 b in size was created on Apr. 25, 2025 and electronically submitted via EFS_Web herewith. These sequence listing is incorporated herein by reference in its entirety.

BACKGROUND

Maize is a food crop with the largest cultivated area in the world, and provides 60% of global caloric intake along with rice and wheat. In recent years, the rapid increase of population and deterioration of ecological environment threaten food safety to a certain extent, making improving maize production being one of the important means of ensuring global food safety. Currently, it is difficult to further enlarge the cultivated area of maize, therefore, improving the maize quality, especially improving the starch content of maize kernels becomes an important research direction in maize breeding worldwide. In addition, it is found in the research that multiple starch synthesis genes undergo convergence selection in the process of grain domestication. Starch accounts for 65%-75% of dry weight of maize kernels, which directly affects the kernel weight and size, and is a dominant factor in determining yield. Therefore, it is necessary to accelerate the exploration of candidate genes related to starch content of maize kernels.

Compared with temperate maize, tropical and subtropical maize germplasms have higher genetic diversity, which are important germplasm resources for maize breeding. In this study, six tropical and subtropical maize inbred lines with significant differences in kernel starch content are used as parents, to construct a multiparent population (MPP) with rich variation in kernel starch content. All the six materials used as parents are inbred lines which have important breeding values (Yin et al., 2022; Jiang et al., 2023). Exploring functional genes closely associated with the starch content of maize kernels from the MPP composed of the six parents provides a theoretical basis for molecular marker-assisted selection of maize with high starch content.

SUMMARY

In view of the shortcomings in the prior art, the disclosure provides an application of a Zm00001d012005 gene in regulating starch content of maize kernels. The functional gene Zm00001d012005, which is closely associated with the starch content of maize kernels, is identified, providing a theoretical basis for molecular marker-assisted selection of maize with high starch content.

To realize the above objective, the disclosure employs the following technical solutions.

In one aspect, the disclosure provides an application of a gene related to starch content of maize kernels in molecular mark-assisted breeding of maize, and a sequence of the Zm00001d012005 gene is as shown in SEQ ID NO: 1.

Further, a base at 2724 bp locus from 5' terminal of the Zm00001d012005 gene shows G/A polymorphism.

In another aspect, the disclosure provides a kit, and the kit contains a reagent for detecting the Zm00001d012005 gene in maize, and the sequence of the Zm00001d012005 gene is as shown in SEQ ID NO: 1.

Further, in an implementation, an application of the kit in identifying or assisting in identifying the starch content of maize kernels is provided.

Further, the application is for detecting a genotype at the 2724 bp locus from the 5' terminal of the sequence as shown in SEQ ID NO: 1 in maize, the genotype is AA or AG, and maize with a target trait of high kernel starch content is obtained.

In yet another aspect, the disclosure provides an application of a single nucleotide polymorphism (SNP) locus in gene-editing breeding to enhance the starch content of maize kernels, and the application involves mutating a base G at the 2724 bp locus from the 5' terminal of the sequence as shown in SEQ ID NO: 1 to A, resulting in an AA or AG genotype.

Further, a gene-editing breeding tool is a CRISPR/Cas9 system.

In still another aspect, the disclosure provides a method for increasing the starch content of maize kernels, which involves mutating the base G at the 2724 bp locus from the 5' terminal of the sequence as shown in SEQ ID NO: 1 to A, resulting in the AA or AG genotype.

The technical effects achieved by the disclosure are as follows:

In this study, the temperate maize inbred line Ye107 with relatively low kernel starch content is used as a common parent, which is crossed with five tropical and subtropical maize inbred lines which have relatively high kernel starch content, to construct a maize MPP with significant differences in kernel starch content. Genome-wide association study (GWAS) analysis and genetic linkage analysis are utilized to co-localize SNP_166371888 which is on chromosome 8 and significantly associated with kernel starch content, and a functional gene Zm00001d012005 that regulates kernel starch content is further identified. The gene Zm00001d012005 can explain 10.19% of phenotypic variation in kernel starch content. Haplotype analysis shows that in 521 recombinant inbred lines (RILs), Zm00001d012005 has two haplotypes, i.e., Hap1(G) and Hap2(A), with Hap2 having significantly higher kernel starch content than Hap1. Therefore, Hap2 of the Zm00001d012005 gene is a haplotype that significantly increases kernel starch content. The results of this study favor for further research on a regulatory mechanism of starch content of maize kernels, and also provide a theoretical basis for developing maize varieties with high starch content.

DETAILED DESCRIPTION

Figure 1A:
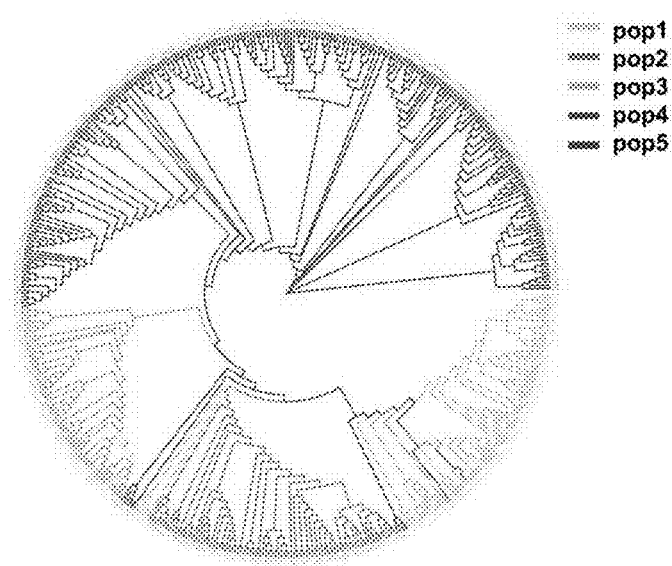
FIG. 1a shows a phylogenetic tree for a population structure of 521 RILs in an embodiment of the disclosure.

For clearer objective, technical solutions and advantages of the disclosure, the technical solutions of the embodiment in the disclosure will be described clearly and completely by reference to the accompanying drawings of the embodiment in the disclosure below. Obviously, the embodiment described is only some, rather than all embodiments of the disclosure. On the basis of the embodiment of the disclosure, all other embodiments obtained by those ordinary skilled in the art without creative efforts are included in the scope of protection of the disclosure.

Embodiment 1

1. Experiment 1.1 Plant Materials and Trial Design

Six excellent lines Ye107, CML384, CML395, YML46, YML32 and CML171 were taken as parents (Table 1), among which, Ye107 came from temperate regions, CML384 from subtropical regions, and CML395, YML46, YML32 and CML171 from tropical regions.

YS(23°19'-23°59'N, 103°35'-104°45'E) and JH(21°27'-22°36'N, 100°25'-101°31'E) of Yunnan province in China were selected as trial sites.

Ye107 served as a common parent in this study, which was crossed with five other lines, respectively. A single-seed descent method was employed from F1 to F9, to construct an MPP (pop1: Ye107×CML384, pop2: Ye107×CML395, pop3: Ye107×YML46, pop4: Ye107×YML32, and pop5: Ye107×CML171).

TABLE 1

Parental information

| Parents | Pedigree | Ecological type | Kernel starch content (%) |
|---|---|---|---|
| Ye107 | Derived from US hybrid DeKalb XL80 | Temperature | 73.8 |
| CML384 | P502c1#-771-2-2-1-3-B-1-1-3-1(DH) | Subtropical | 75.0 |
| CML395 | 90323B-1-B-1-B*4-1-1-2-1(DH) | Tropical | 74.3 |
| YML46 | SW1-1-1-2-1-2-1 | Tropical | 68.0 |
| YML32 | Suwan 1(S)C9-S8-346-2 (Kei 8902)-3-4-4-6 | Tropical | 69.8 |
| CML171 | G25QS4B-MH13-5-B-1-1-2-B-1-B-B-B-1-1-6-1(DH) | Tropical | 68.1 |

A completely randomized block design was employed in the experiment, with three replicates at each site. A field trial plot was 3 meters long, with a row spacing of 0.70 meters, 14 plants per row, and two rows per plot. The trials were conducted at YS and JH in year 2022 and 2023.

1.2 Phenotypic Statistical Analysis

A near infrared reflectance spectroscopy (NIRS, No. S-14105 Kungens Kurva, Sweden) was employed to quantify kernel starch content of 601 RILs. 30 seeds were randomly selected from each line for three repeated measurements, and a mean of the three measurements is taken as a final value. Additionally, BLUP values for the phenotypic data from three replicates in two environments were calculated using a mixed linear model (MLM). A mean, a standard deviation, and a coefficient of variation for 521 RILs were calculated using Excel 2019. A Shapiro-Wilk test was performed on the phenotypic data to assess whether they followed a normal distribution. The correlation of phenotypic data in three environments was visualized at http-shiplot.com.cn/home/index.html.

1.3 Genotyping-by-Sequencing (GBS)

Firstly, genomic DNA was extracted from mature seeds using a PureLink DNA kit (Thermo Fisher Scientific, USA). The genomic DNA was fragmented using restriction enzymes PstI and MspI (New England BioLabs, Ipswich, USA), and adapters were ligated to terminals of the DNA fragments using T4 ligase (New England BioLabs, Ipswich, USA). Before the polymerase chain reaction (PCR) amplification, ligation products were pooled and purified using a QIAquick PCR purification kit (QIAGEN, Valencia, USA). Final PCR products were also purified using the QIAquick PCR purification kit, and a library concentration was measured using a Qubit 2.0 fluorometer and a Qubit dsDNA HS assay kit (Life Technologies). The library was sequenced on an Illumina NovaSeq 6000 platform (Illumina Inc., San Diego, USA) in a 150 bp paired-end sequencing mode. After sequencing, original data were filtered to remove the adapters and low-quality sequences.

1.4 SNP Identification, Filtration and Annotation

Clean reads were compared with the maize B73 v4 genome using a BWA v0.7.17 tool to generate a bam file. SNP was extracted using GATK v4.1.4.0 software, and the clean reads were compared with the maize B73 v4 genome. SNP was extracted using Plink v1.9 software to filter out loci with a missing rate higher than 20% and SNPs with a minor allele frequency (MAF) lower than 5%, with parameters set to --geno 0.2 and --maf 0.05. The SNPs were annotated using ANNOVAR v2021-7-16 software to determine the regions of variation loci and the types of mutations on the genome.

1.5 Population Structure Analysis and LD Analysis

TreeBeST v1.9.2 software was used for calculating a distance matrix, to construct a phylogenetic tree. Bootstrap values were obtained by means of 1000 calculations. Genome-wide complex trait analysis (GCTA) was used for performing PCA, and scatterplot3d was used to visualize the results. Admixture v1.3.0 was employed to preset K value, and population structure analysis was performed, and the results are visualized using ggplot2.

PopLDdecay software was used for calculating the degree of LD ($r^2$) between any two makers, and script Plot_One-Pop.pl of the PopLDdecay software was used to plot an LD decay plot.

1.6 Linkage Mapping and QTL Location

Firstly, progeny genotyping was filtered on the basis of a completeness threshold of 0.8 and a segregation distortion threshold of 0.001 to obtain population markers. Subsequently, bins were created on the basis of the population markers (with bins created every 15 unlinked markers), and final population markers are obtained. Joinmap4.0 was used to order the bin markers for each population and to calculate the genetic distances between markers using a Kosambi function.

A logarithm of the odds (LOD) threshold was determined to be 2.5 through 1000 random permutation tests (P<0.05). The QTL locations of starch content were determined using a composite interval mapping (CIM) method. If a genetic distance between intervals exceeding a threshold line was less than 10 cM, they were considered as a single interval.

1.7 GWAS and Haplotype Analysis of Candidate Genes

On the basis of the mean of 521 starch content data in three environments and their BLUP values, in this study, GWAS was performed using the MLM in genome-wide efficient mixed model association (GEMMA). Population structure and genetic relationship were introduced as covariates to reduce errors, with the parameter set to −1 mm 1. SNP loci meeting or exceeding the significance threshold were extracted using bedtools v1.7. The results were visualized using CMplot v3.6.2.

With reference to the maize B73 v4 reference genome sequence in the MaizeGDB genome browser (www.maizegdb.org/), candidate genes were predicted within a 10 kb region upstream and downstream of the significant SNPs. Functional annotations of the candidate genes were obtained by browsing the MaizeGDB and NCBI (www.ncbi.nlm.nih.gov/) databases. Finally, haplotype analysis for the candidate genes was performed using Haploview v4.2 software.

2. Results

2.1 Analysis of Kernel Starch Content

The starch phenotype data of the five subpopulations are statistically analyzed, as shown in Table 2 below:

TABLE 2

| Statistical analysis of kernel starch content | | | | | | |
|---|---|---|---|---|---|---|
| Population | Environment | Mean | Standard deviation | Range of variation | Coefficient of variation (%) | Heritability (%) |
| pop1 | 21YS | 69.50 | 1.593 | 65.3-74.7 | 2.29 | |
| | 22YS | 69.22 | 1.811 | 64.4-76.5 | 2.62 | 50.33 |
| | 23JH | 69.73 | 2.455 | 63.6-75.3 | 3.52 | |
| pop2 | 21YS | 71.33 | 1.499 | 67.9-75.9 | 2.10 | |
| | 22YS | 71.76 | 1.717 | 67.9-77.0 | 2.39 | 47.96 |
| | 23JH | 69.85 | 2.108 | 65.2-74.7 | 3.02 | |
| pop3 | 21YS | 70.31 | 1.674 | 65.8-75.1 | 2.38 | |
| | 22YS | 70.12 | 2.107 | 64.9-75.5 | 3.00 | 67.91 |
| | 23JH | 70.66 | 2.166 | 64.6-75.5 | 3.07 | |
| pop4 | 21YS | 70.66 | 1.729 | 64.3-76.1 | 2.45 | |
| | 22YS | 70.49 | 2.139 | 65.1-76.2 | 3.03 | 55.66 |
| | 23JH | 71.37 | 2.222 | 65.1-76.7 | 3.11 | |
| pop5 | 21YS | 69.89 | 1.448 | 65.1-73.7 | 2.07 | 58.79 |
| | 22YS | 69.22 | 1.986 | 61.4-74.2 | 2.87 | |
| | 23JH | 69.87 | 2.302 | 62.9-79.5 | 3.30 | |

2.2 Population Structure Analysis and LD Analysis

Figure 1B:
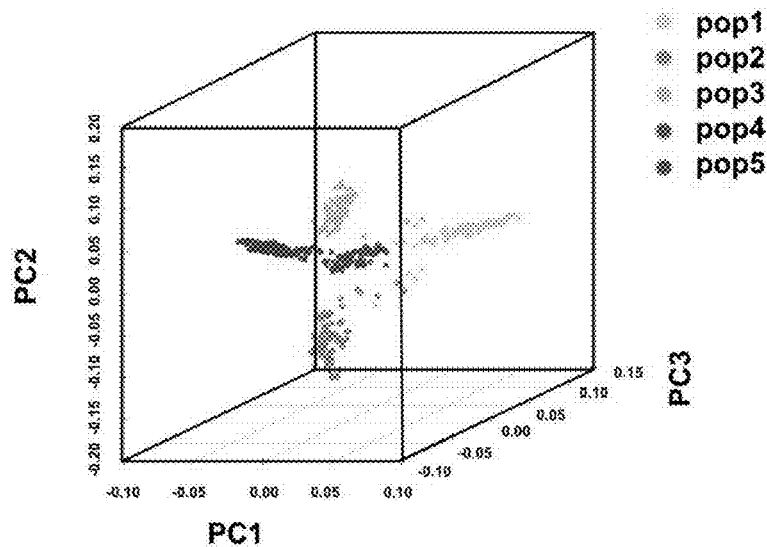
FIG. 1b shows principal component analysis (PCA) for the population structure in the embodiment of the disclosure.
Figure 1C:
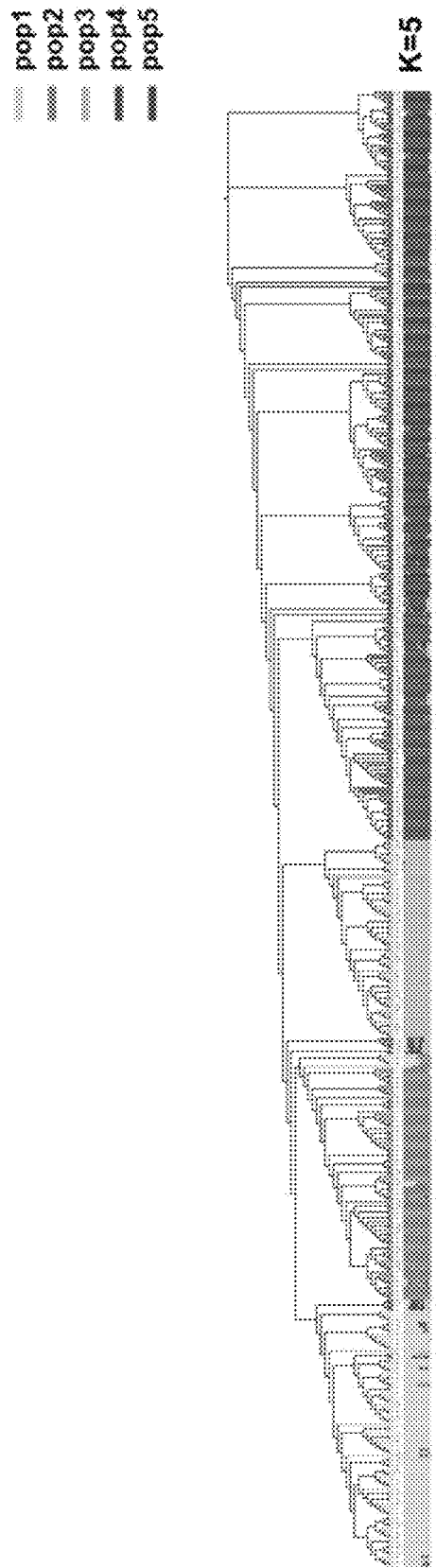
FIG. 1c shows a Bayesian clustering plot of 521 RILs when K=5 in the embodiment of the disclosure.

Population structure analysis results are shown in FIG. 1a-FIG. 1d. Overall, a phylogenetic tree shows that the 521 RILs are clustered into five populations (FIG. 1a). The PCA of starch content is consistent with the MPP construction results in this study (FIG. 1b). For the population structure, when K=5, the 521 RILs are clearly divided into five populations (FIG. 1c).

Figure 1D:
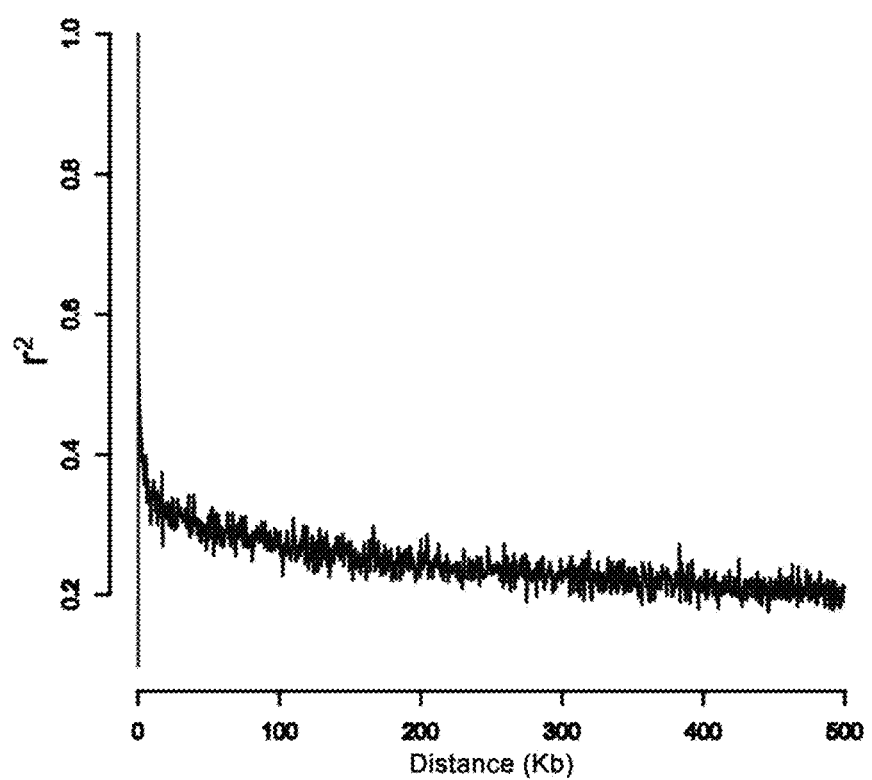
FIG. 1d shows a linkage disequilibrium (LD) decay plot in the embodiment of the disclosure.

When $r^2$ drops gradually, a genetic distance between loci is 10 kb, and the degree of association between loci tends to stabilize. These loci may contain genetic variations associated with a target trait, and therefore, in this study, the significant SNP and its 10 kb range upstream and downstream as the criteria for screening candidate genes (FIG. 1d).

2.3 QTL Location of Kernel Starch Content

Figure 2A:
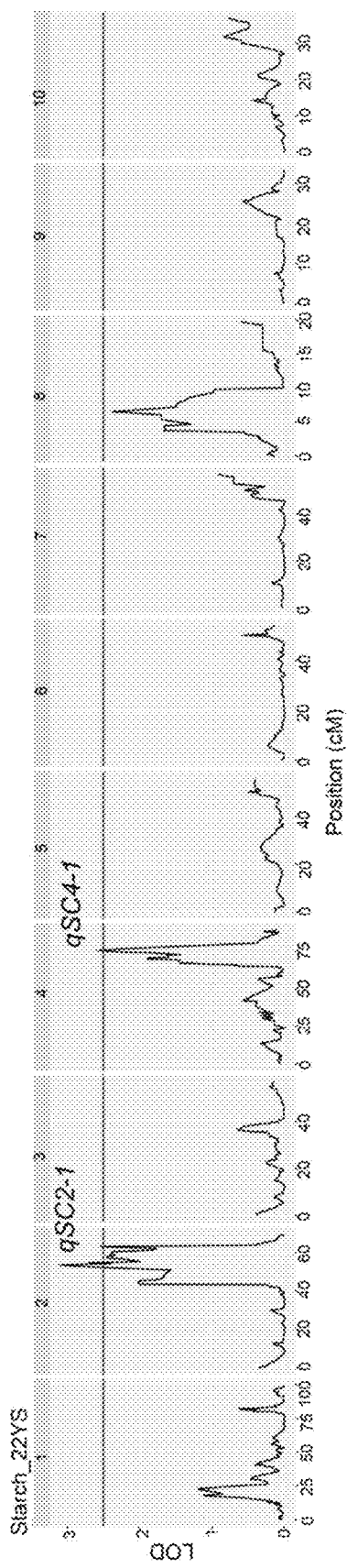
FIG. 2a is an analysis diagram showing significant quantitative trait loci (QTLs) which are related to starch content of maize kernels and are identified in pop 1 in a 22YS environment in the embodiment of the disclosure.
Figure 2B:
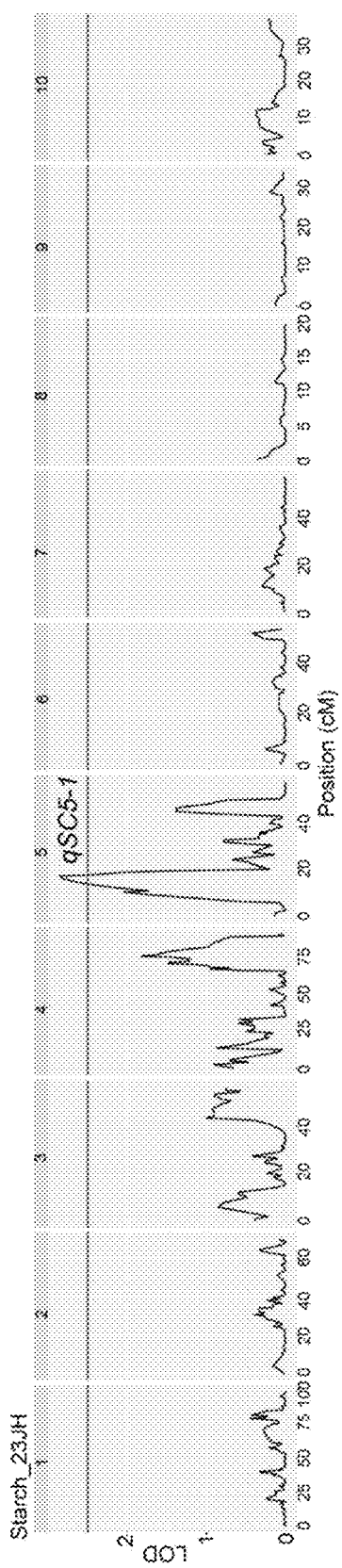
FIG. 2b is an analysis diagram showing significant QTLs which are related to the starch content of maize kernels and are identified in pop 1 in a 23JH environment in the embodiment of the disclosure.
Figure 3A:
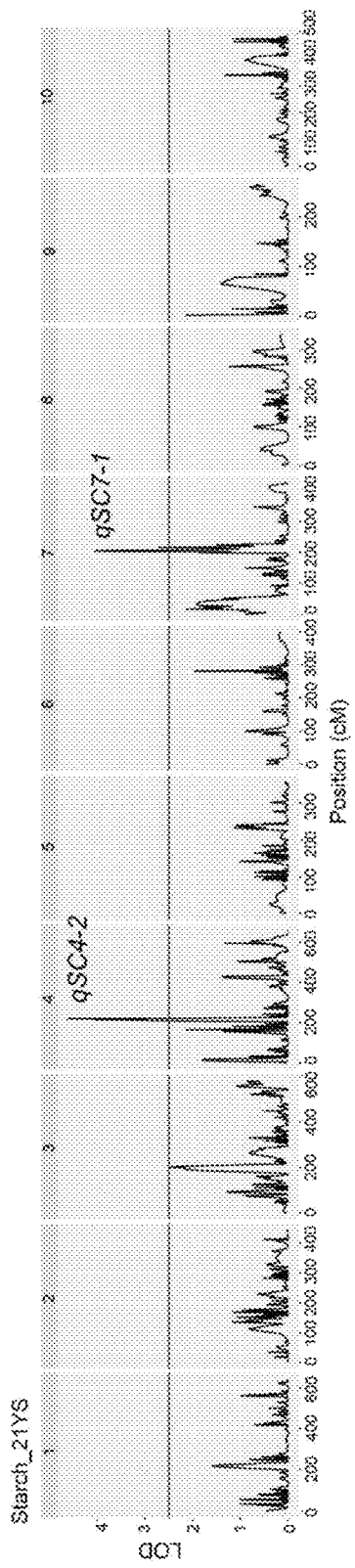
FIG. 3a shows an analysis diagram showing significant QTLs which are related to the starch content of maize kernels and are identified in pop 2 in a 21YS environment in the embodiment of the disclosure.
Figure 3B:
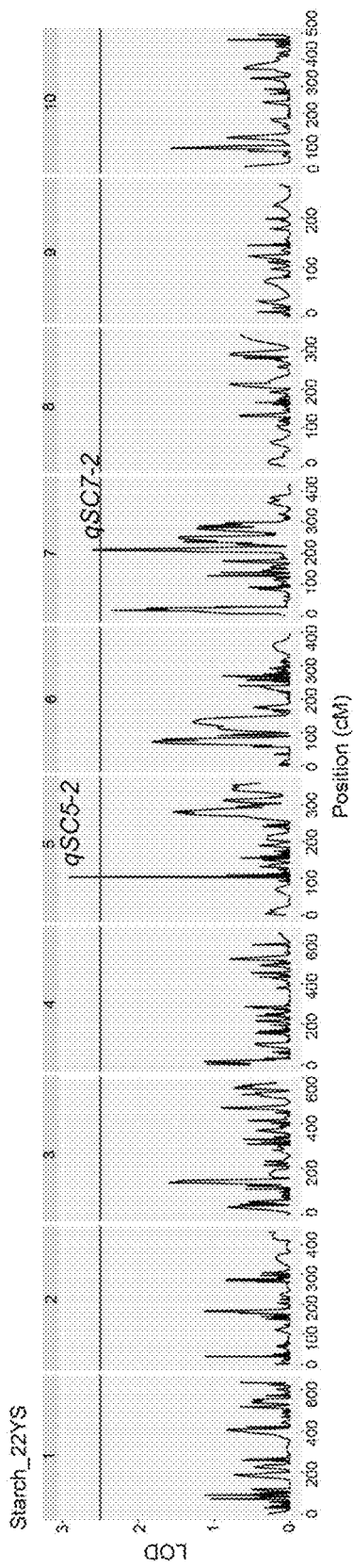
FIG. 3b shows an analysis diagram showing significant QTLs which are related to the starch content of maize kernels and are identified in pop 2 in a 22YS environment in the embodiment of the disclosure.
Figure 3C:
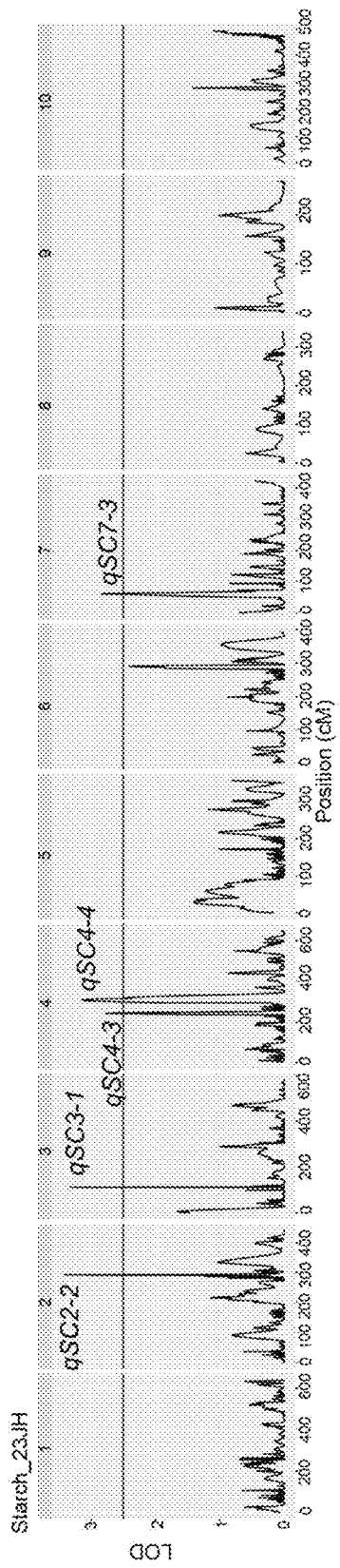
FIG. 3c shows an analysis diagram showing significant QTLs which are related to the starch content of maize kernels and are identified in pop 2 in a 23JH environment in the embodiment of the disclosure.
Figure 4A:
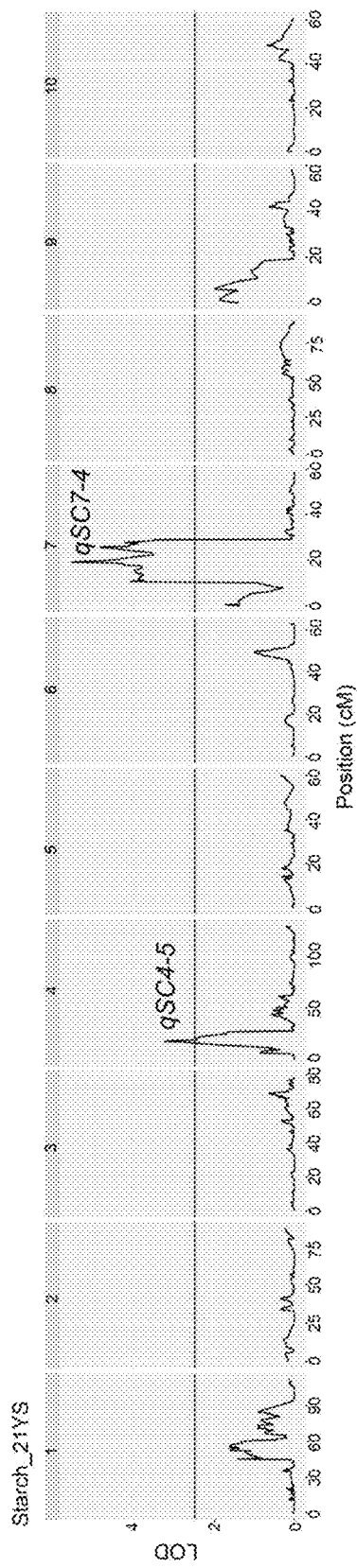
FIG. 4a shows an analysis diagram showing significant QTLs which are related to the starch content of maize kernels and are identified in pop 3 in a 21YS environment in the embodiment of the disclosure.
Figure 4B:
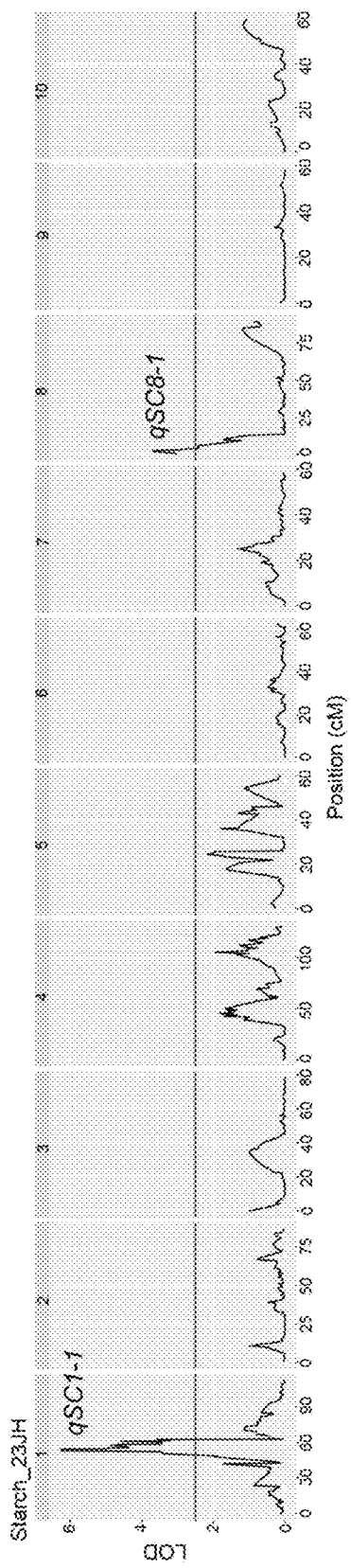
FIG. 4b shows an analysis diagram showing significant QTLs which are related to the starch content of maize kernels and are identified in pop 3 in a 23JH environment in the embodiment of the disclosure.
Figure 5A:
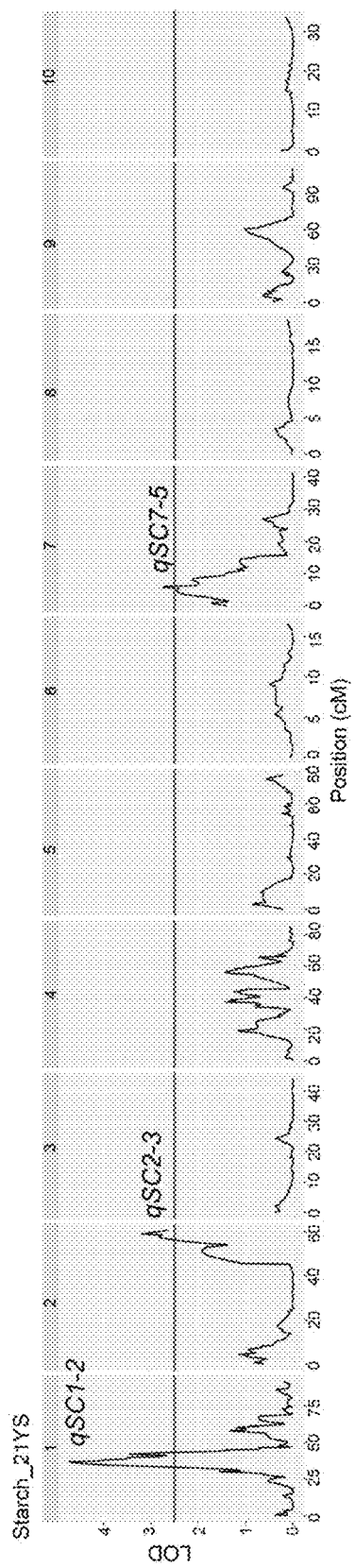
FIG. 5a shows an analysis diagram showing significant QTLs which are related to the starch content of maize kernels and are identified in pop 4 in a 21YS environment in the embodiment of the disclosure.
Figure 5B:
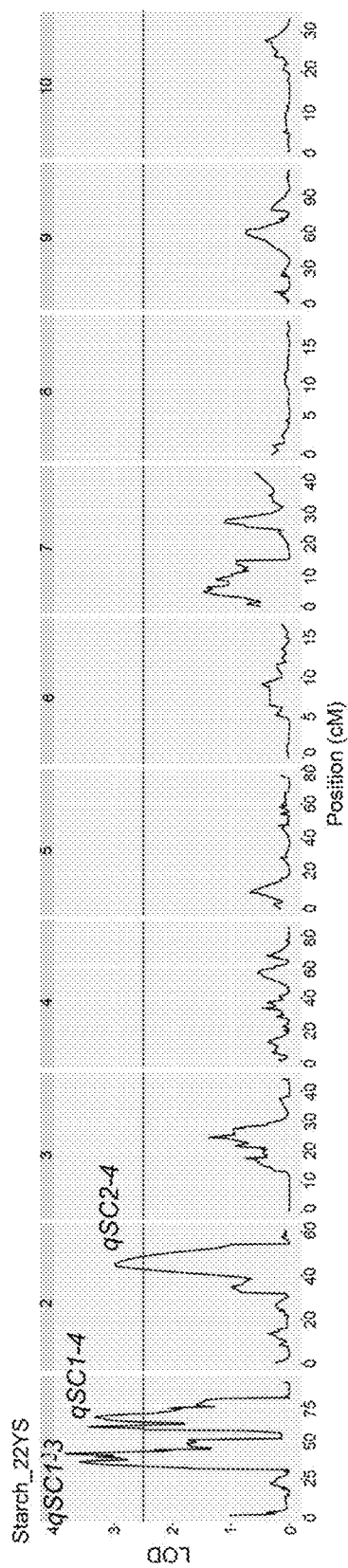
FIG. 5b shows an analysis diagram showing significant QTLs which are related to the starch content of maize kernels and are identified in pop 4 in a 22YS environment in the embodiment of the disclosure.
Figure 5C:
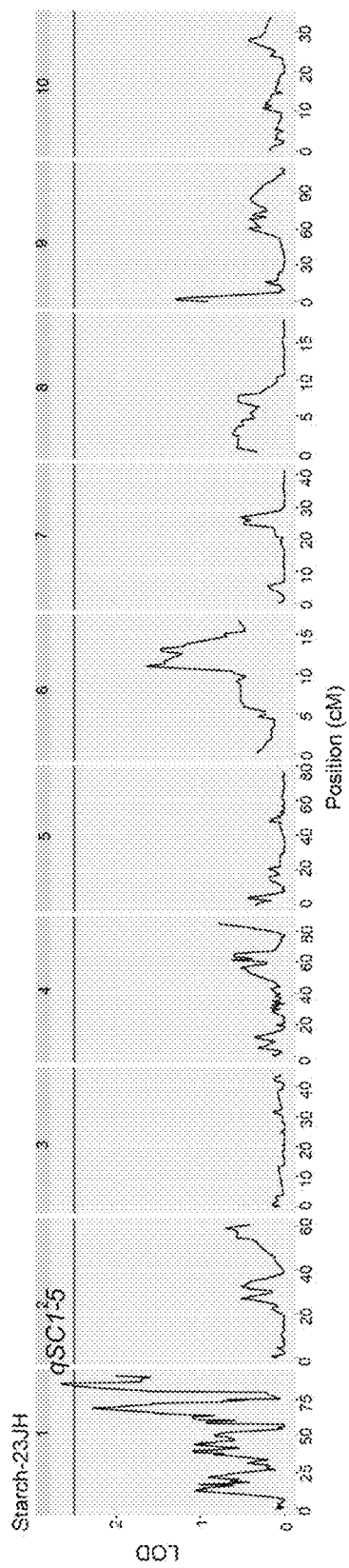
FIG. 5c shows an analysis diagram showing significant QTLs which are related to the starch content of maize kernels and are identified in pop 4 in a 23JH environment in the embodiment of the disclosure.
Figure 6A:
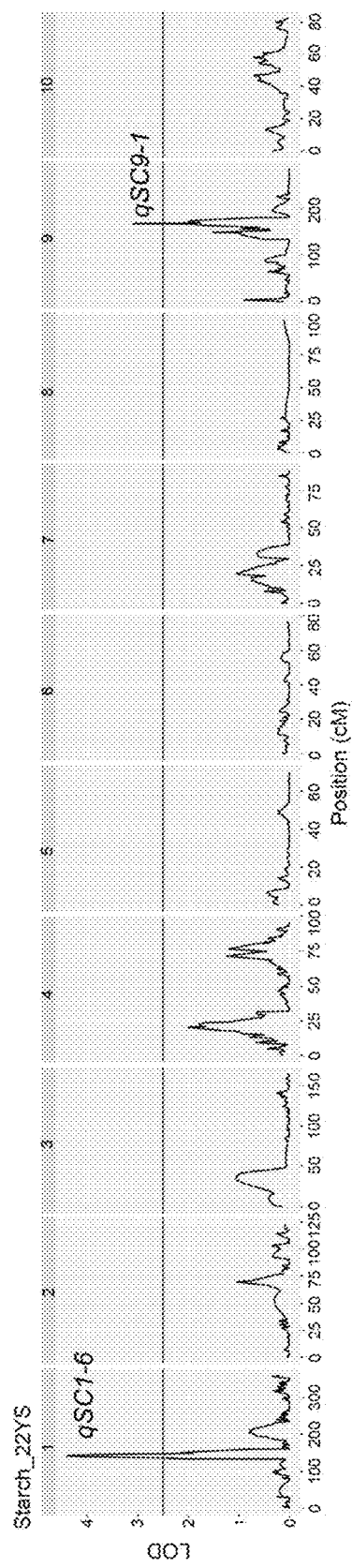
FIG. 6a shows an analysis diagram showing significant QTLs which are related to the starch content of maize kernels and are identified in pop 5 in a 22YS environment in the embodiment of the disclosure.
Figure 6B:
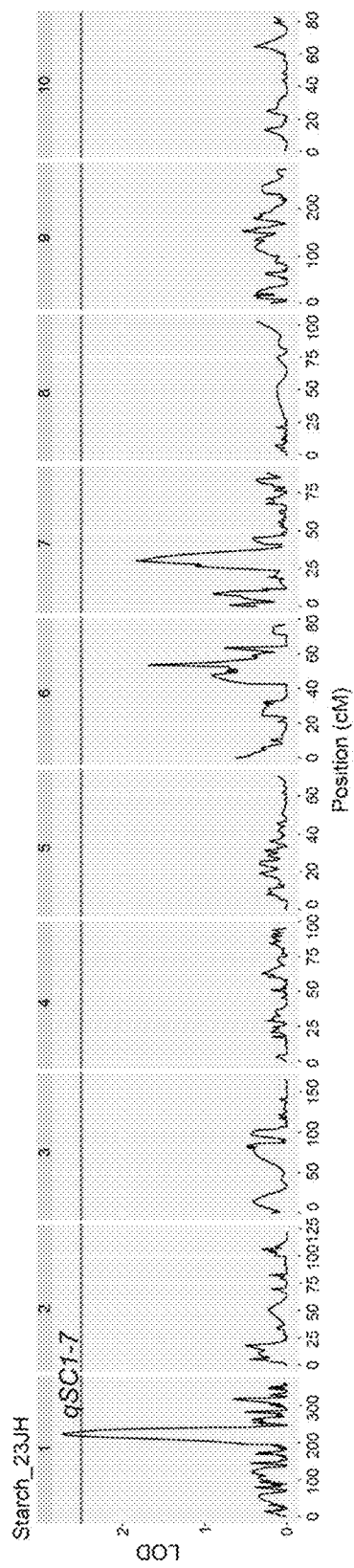
FIG. 6b shows an analysis diagram showing significant QTLs which are related to the starch content of maize kernels and are identified in pop 5 in a 23JH environment in the embodiment of the disclosure.

In this study, on the basis of high-density genetic linkage maps of the five subpopulations, significant QTLs associated with starch content of maize kernel are screened. For pop1, three significant QTLs in the 22YS environment are detected, including two significant QTLs, qSC2-1 and qSC4-1 (FIG. 2a), and one significant QTL, qSC5-1, is detected in the 23JH environment (FIG. 2b). For pop2, two significant QTLs, qSC4-2 and qSC7-1 are detected in the 21YS environment (FIG. 3a), and two significant QTLs, qSC5-2 and qSC7-2, are detected in the 22YS environment (FIG. 3b), and five significant QTLs, qSC2-2, qSC3-1, qSC4-3, qSC4-4 and qSC7-3, are detected in the 23JH environment (FIG. 3c). For pop3, two significant QTLs are detected in the 21YS environment, and qSC4-5 and qSC7-4 (FIG. 4a), along with two significant QTLs, qSC1-1 and qSC8-1 (FIG. 4b), are detected in the 23JH environment. For pop4, three significant QTLs, qSC1-2, qSC2-3 and qSC7-5, are detected in the 21YS environment (FIG. 5a), three significant QTLs, qSC1-3, qSC1-4 and qSC2-4, are detected in the 22YS environment (FIG. 5b), and one significant QTL, qSC1-5, is detected in the 23JH environment (FIG. 5c). For pop5, two important QTLs, qSC1-6 and qSC9-1, are detected in the 22YS environment (FIG. 6a), and one important QTL, qSC1-7, is detected in the 23JH environment (FIG. 6b).

Many of the QTLs identified in this study, which are closely related to starch content of maize kernels, exhibit overlaps in different subpopulations. The overlapping QTLs are important for further investigation. It is found that QTL qSC1-2 identified in pop4 in the 21YS environment has the same interval with QTL qSC1-3 identified in the 22YS environment. Additionally, partial overlaps are observed between QTL intervals. QTL qSC2-1 identified in pop1 in the 22YS environment partially overlaps with the intervals of QTL qSC2-3 and qSC2-4 identified in pop4 in the 21YS and 22YS environments, respectively. QTL qSC4-1 identified in pop1 in the 22YS environment partially overlaps with the interval of QTL qSC4-3 identified in pop2 in the 23JH environment. QTL qSC7-1 identified in pop2 in the 21YS environment partially overlaps with the intervals of QTL qSC7-5 identified in pop4 in the 21YS environment and QTL qSC7-4 identified in pop3 in the 21YS environment. QTLs qSC1-2 and qSC1-3 identified in pop4 in the 21YS and 22YS environments, respectively, partially overlap with the interval of QTL qSC1-1 identified in pop3 in the 23JH environment. QTL qSC7-5 identified in pop4 in the 21YS environment completely overlaps with the interval of QTL qSC7-4 identified in pop3 in the 21YS environment. QTL qSC1-4 identified in pop4 in the 22YS environment partially overlaps with the interval of QTL qSC1-1 identified in pop3 in the 23JH environment. QTL qSC1-7 identified in pop5 in the 23JH environment partially overlaps with the intervals of QTLs qSC1-2 and qSC1-3 identified in pop4 in the 21YS and 22YS environments, respectively. QTL qSC1-6 identified in pop5 in the 22YS environment partially overlaps with the intervals of QTL qSC1-4 identified in pop4 in the 22YS environment and the QTL qSC1-1 identified in pop3 in the 23JH environment.

TABLE 3

Significant QTL of kernel starch content

| Population | Environment | QTL | Chromosome | Threshold | Interval mapping (bp) | Phenotypic variation explained (PVE, %) |
|---|---|---|---|---|---|---|
| pop1 | 22YS | qSC2-1 | 2 | 3.10 | 3600538-95882685 | 11.42 |
| | 22YS | qSC4-1 | 4 | 2.58 | 3091019-38257069 | 9.37 |
| | 23JH | qSC5-1 | 5 | 2.85 | 1766221-189983598 | 10.84 |
| | 21YS | qSC4-2 | 4 | 4.62 | 8234598-93625301 | 15.34 |
| | 21YS | qSC7-1 | 7 | 4.05 | 8627244-166108588 | 16.91 |
| pop2 | 22YS | qSC5-2 | 5 | 2.92 | 1357856-138001307 | 10.49 |
| | 22YS | qSC7-2 | 7 | 2.61 | 8148643-83974624 | 10.00 |
| | 23JH | qSC2-2 | 2 | 3.42 | 1440342-147190981 | 10.83 |
| | 23JH | qSC3-1 | 3 | 3.31 | 2846109-106275349 | 10.45 |
| | 23JH | qSC4-3 | 4 | 2.78 | 3496220-36255362 | 10.33 |
| | 23JH | qSC4-4 | 4 | 3.14 | 1439315-148426883 | 14.45 |
| | 23JH | qSC7-3 | 7 | 2.84 | 1771284-179180904 | 9.51 |
| | 21YS | qSC4-5 | 4 | 3.27 | 2014982-203568347 | 14.08 |
| pop3 | 21YS | qSC7-4 | 7 | 5.62 | 1338155-168488752 | 26.15 |
| | 23JH | qSC1-1 | 1 | 6.25 | 9173370-176336688 | 25.04 |
| | 23JH | qSC8-1 | 8 | 3.70 | 1503922-181122637 | 12.17 |
| pop4 | 21YS | qSC1-2 | 1 | 4.72 | 1619624-190891876 | 17.61 |
| | 21YS | qSC2-3 | 2 | 3.18 | 3066481-36423523 | 11.39 |
| | 21YS | qSC7-5 | 7 | 2.74 | 1474807-150363074 | 9.67 |
| | 22YS | qSC1-3 | 1 | 3.83 | 1619624-190891876 | 14.44 |

TABLE 3-continued

Significant QTL of kernel starch content

| Population | Environment | QTL | Chromosome | Threshold | Interval mapping (bp) | Phenotypic variation explained (PVE, %) |
|---|---|---|---|---|---|---|
| | 22YS | qSC 1-4 | 1 | 3.44 | 82695100-101538733 | 12.36 |
| | 22YS | qSC 2-4 | 2 | 2.98 | 52009025-56430250 | 10.94 |
| | 23JH | qSC 1-5 | 1 | 2.65 | 21007004-47132971 | 9.92 |
| pop5 | 22YS | qSC 1-6 | 1 | 4.41 | 82499263-92972017 | 17.00 |
| | 22YS | qSC 9-1 | 9 | 3.09 | 86974932-92313888 | 10.77 |
| | 23JH | qSC 1-7 | 1 | 2.72 | 178169065-179379188 | 24.28 |

2.4 GWAS of Kernel Starch Content

Figure 7A:
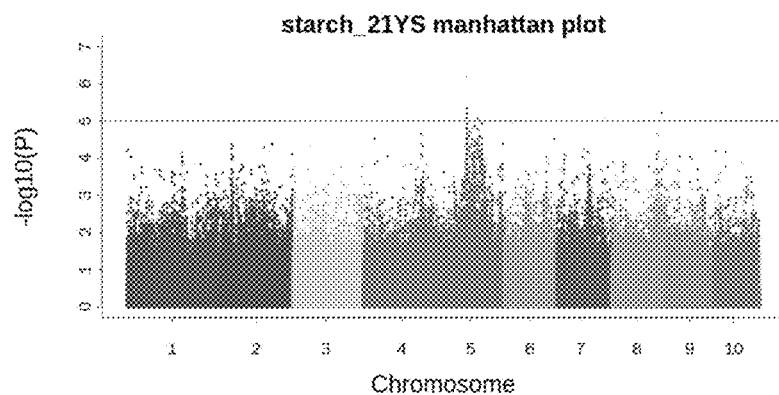
FIG. 7a shows GWAS results for starch content on the basis of a mean starch phenotype at Yanshan (YS) in 2021 in the embodiment of the disclosure.
Figure 7B:
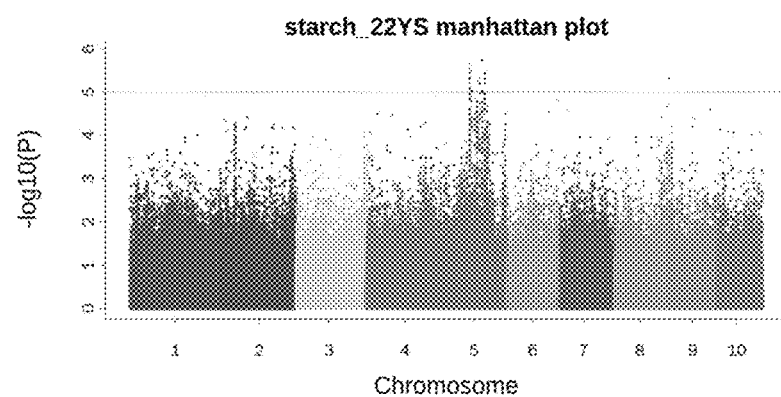
FIG. 7b shows GWAS results for the starch content on the basis of a mean starch phenotype at YS in 2022 in the embodiment of the disclosure.
Figure 7C:
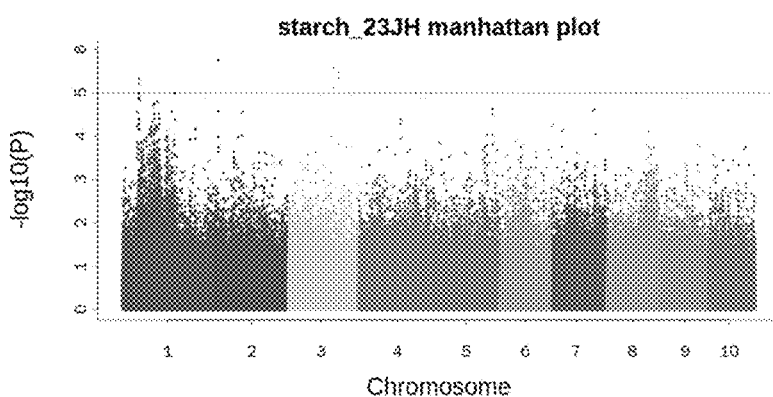
FIG. 7c shows GWAS results for the starch content on the basis of a mean starch phenotype at Jinghong (JH) in 2023 in the embodiment of the disclosure.
Figure 7D:
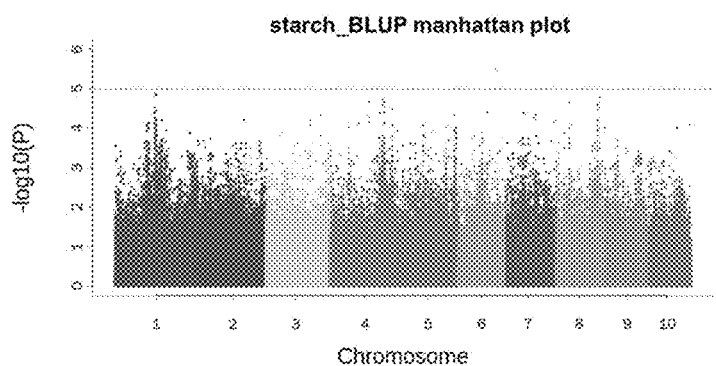
FIG. 7d shows GWAS results for the starch content on the basis of a best linear unbiased prediction (BLUP) value for starch in the embodiment of the disclosure.

GWAS is conducted using 582663 high-quality SNPs in combination with the mean starch content value of 521 RILs of the MPP in three environments. Additionally, GWAS is performed using the BLUP values of starch content in all subpopulations. The MLM model in GEMMA is employed to identify loci associated with kernel starch content. In the GWAS, population structure and genetic relationship matrices are used as covariates to mitigate false positives. In the 21YS environment, two significant SNPs are identified on chromosomes 5 and 8, explaining 11.23% and 10.19% of phenotypic variance, respectively (FIG. 7a and Table 4). In the 22YS environment, seven significant SNPs are detected on chromosomes 5 and 8, explaining 5.72%-10.49% of phenotypic variation (FIG. 7b and Table 4). In the 23JH environment, two significant SNPs are identified on chromosomes 1 and 2, explaining 4.86% and 4.38% of phenotypic variation, respectively (FIG. 7c and Table 4). The GWAS based on BLUP values identifies one significant SNP on chromosome 6, explaining 8.89% of phenotypic variation (FIG. 7d and Table 4). Notably, the GWAS shows that the same significant SNP 5_97046470 is detected in both the 21YS and 22YS environments.

Given that LD decay analysis shows that the physical distance between loci decays at 10 kb, candidate genes within 10 kb upstream and downstream of the significant SNP are screened, ultimately identifying 14 candidate genes potentially associated with the starch content of maize kernels (Table 5).

TABLE 4

Significant SNP of kernel starch content

| Environment | SNP | Chromosome | Position (bp) | Mutatuib | PVE (%) | Theshold |
|---|---|---|---|---|---|---|
| 21YS | 5_97046470 | 5 | 97046470 | G/C | 11.23 | 5.33 |
| | 8_166371888 | 8 | 166371888 | G/A | 10.19 | 5.24 |
| | 5_96705777 | 5 | 96705777 | A/G | 10.41 | 5.23 |
| | 5_97026470 | 5 | 97026470 | G/C | 10.29 | 5.36 |
| | 5_98879482 | 5 | 98879482 | T/A | 10.49 | 5.08 |
| 22YS | 5_129613503 | 5 | 129613503 | C/A | 8.23 | 5.20 |
| | 5_138562866 | 5 | 138562866 | G/C | 6.55 | 5.03 |
| | 5_1473351276 | 5 | 147335276 | G/A | 10.22 | 5.50 |
| | 8_178656036 | 8 | 178656036 | T/A | 5.72 | 5.33 |
| 23JH | 1_54575694 | 1 | 54575694 | G/A | 4.86 | 5.30 |
| | 2_11478963 | 2 | 11478963 | A/T | 4.38 | 5.74 |
| BLUP | 6_137604184 | 6 | 137604184 | C/T | 8.89 | 5.48 |

TABLE 5

Candidate genes for kernel starch content on the basis of GWAS

| SNP | Candidate genes | Chromosome | Start & Ebd | Functional annotation |
|---|---|---|---|---|
| 5_97046470 | Zm00001d015551 | 5 | 97049470-97050003 | / |
| 8_166371888 | Zm00001d012005 | 8 | 166369165-166375273 | Histidine kinase |
| 5_96705777 | Zm00001d015545 | 5 | 96698291-96698985 | Protein phosphatase 2C |
| | Zm00001d015546 | 5 | 96701931-96707760 | / |

TABLE 5-continued

Candidate genes for kernel starch content on the basis of GWAS

| SNP | Candidate genes | Chromosome | Start & Ebd | Functional annotation |
|---|---|---|---|---|
| 5_97046470 | Zm00001d015551 | 5 | 97049470-97050003 | / |
|  | Zm00001d015571 | 5 | 98866461-98875915 | / |
| 5_98879482 | Zm00001d015572 | 5 | 98876242-98877021 | / |
| 5_129613503 | Zm00001d015891 | 5 | 129629958-129632006 | Protein LRKS7 |
| 5_138562866 | Zm00001d016000 | 5 | 138562425-138590869 | Myb-related protein 3R-1 |
| 5_147335276 | Zm00001d016152 | 5 | 147337518-147343809 | / |
|  | Zm00001d012685 | 8 | 178635302-178641627 | Mitochondrial import inner membrane translocase subunit TIM50 |
| 8_178656036 | Zm00001d012686 | 8 | 178642508-178644235 | / |
|  | Zm00001d012687 | 8 | 178645606-178650028 | Triglyceride lipase |
| 1_54575694 | Zm00001d029008 | 1 | 54577150-54580933 | O-fucosyltransferase family protein |
| 2_11478963 | Zm00001d002378 | 2 | 11470204 11474115 | Cationic transporter HKT7 |

2.5 Integration of QTL Location and GWAS to Reveal Candidate Genes

In this study, QTL location and GWAS analysis are employed to identify loci associated with kernel starch content. The comparison of the two analysis results shows that the candidate SNIP 8_166371888 located on chromosome 8 and identified by GWAS in the 21YS environment overlaps within the QTL interval of qSC8-1 mapped in pop3 in the 23JH environment (Table 6). Similarly, another important SNP 8_178636036 located on chromosome 8 and identified by GWAS in the 22YS environment falls within the QTL interval of qSC8-1 identified in pop3 in the 23JH environment (Table 6). On the basis of the co-localization analysis, four candidate genes (Zm00001d012005, Zm00001d012685, Zm00001d012686, and Zm0000d012687) are identified as potentially related to the starch content of maize kernels (Table 6). Zm00001d012005 is located on SNP 8_166371888. Zm00001d012685 is located on SNP 8_178636036. Zm00001d012686 and Zm00001d012687 are located nearby SNIP 8_178636036. Functional annotations of the candidate genes are performed using the NCBI and MaizeGDB databases, and the results show that Zm00001d012005 encodes the histidine kinase, Zm00001d012685 encodes the mitochondrial import inner membrane translocase subunit TIM50, and Zm00001d012687 encodes the triacylglycerol lipase.

TABLE 6

Candidate genes for kernel starch content co-localized by QTL and GWAS

| Candidate genes | Chromosome | QTL | SNP | Start & End | Functional annotation |
|---|---|---|---|---|---|
| Zm00001d012005 | 8 | qSC8-1 | 8_166371888 | 166369165-166375273 | Histidine kinase |
| Zm00001d012685 | 8 | qSC8-1 | 8_178656036 | 178635302-178641627 | Mitochondrial import inner membrane translocase subunit TIM50 |
| Zm00001d012686 |  |  |  | 178642508-178644235 | / |
| Zm00001d012687 |  |  |  | 178645606-178650028 | Histamine kinase |

2.6 Haplotype Analysis

Figure 8:
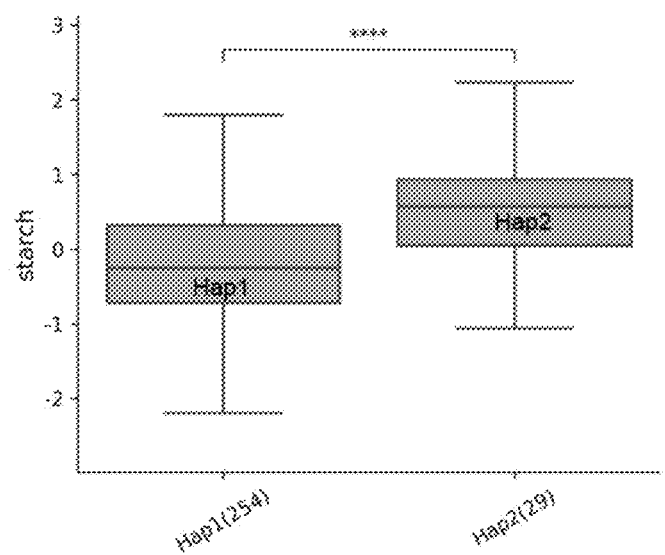
FIG. 8 shows a haplotype analysis diagram of starch candidate genes in the embodiment of the disclosure, showing the distribution of haplotypes of Zm00001d012005 in four subpopulations.

Haplotype analysis shows that in 521 RILs, Zm00001d012005 (a gene sequence of Zm00001d012005 is as shown in SEQ ID NO: 1) has two haplotypes: Hap1(G) and Hap2(A). In 521 RILs, the distribution frequency of Hap1 is 254, and the distribution frequency of Hap2 is 29 (FIG. 8). It is to be noted that, in the five subpopulations, the starch content of Hap2 is the highest, and the starch content of Hap1 is the lowest. There is significant correlation between the haplotypes of Hap1 and Hap2 (FIG. 8). Therefore, it is concluded that Hap2 is the main haplotype that increases the kernel starch content, and Hap1 is the main haplotype that decreases the kernel starch content.

The embodiment described above is merely used for illustrating the technical solutions of the disclosure, rather than limiting the disclosure. Although the disclosure is described in detail by reference to the foregoing embodiment, it is to be understood by those ordinary skilled in the art that the technical solutions in each embodiment can still be modified or some technical features can be replaced equivalently, and those modifications or replacements cannot make the essence of the corresponding technical solutions out of the spirit and scope of the technical solutions in each embodiment of the disclosure.

The invention claimed is:

1. A method for identifying a starch content of maize kernels, comprising extracting genomic DNA from maize mature seeds;

subjecting the genomic DNA to genotyping; and determining a genotype of at 2724 bp locus from 5' terminal of a Zm00001d012005 gene sequence as shown in SEQ ID NO: 1 in maize, wherein an AA or AG genotype at the 2724 bp locus has a higher starch content of the maize kernels than a GG genotype.

* * * * *

SEQUENCE LISTING

```
Sequence total quantity: 1
SEQ ID NO: 1            moltype = DNA   length = 6109
FEATURE                 Location/Qualifiers
source                  1..6109
                        mol_type = genomic DNA
                        organism = Zea mays
SEQUENCE: 1
cgtgctggcc tctcccactg gcgccacctc ccctccttt  ctcttcttcc tccgtccgcc    60
cgtcccccaa tccctccgct cctctctacc agccgagacc gagagagagc gcccgaccct   120
accacagctg ctgcctgctg ctgctctgtt ctgctctccc ccttttccac cgtttctctc   180
tcttctcacc tcacctgttt ggccgctttt ctccactccc ctcttccaat cagaccaatc   240
tccccgtctc cctaaacacg aataccatcc ctctgctccg gtgttccggc tctcccacgc   300
accccacccc accccactag tttttgcttc ctgttcactt gtgcctgctc tcgctcgctg   360
ttggcctgtt gctgttgcta ttcccgtccc gtgcttccct tcctctcact ggtcgtctag   420
tatcctctct cccacctgcc gctgccgccg ccgccgccgc cgccgccctg ctcccacctg   480
ccgtcctctg gtcaaagcca gcggctcccg agatttgcg ctgcttcctt gcttgaggaa   540
tcaagcctga gcggtgagag atcaagaggg agggacggag cgagagacgc aagaggaaag   600
ggagccagcc cctcgcgccc ggcattcaat tggagccaac agtaggcggg tggggcggct   660
gctacagcac gtcggactcc ataaattagc tccccgcttt ccggccccct tttcgccccg   720
tgtctccccc gatcggcccg tcgacgacgc ggacgcccgc cggagcatgc gcgccgcggg   780
cctcggccgc cgcagcgccg ccgccggcgt ccggaagatg tagctccgcg acccgccggc   840
agagggcgag gggatgacc  gttacggcgc gcggaggag cggcggggcc gggatggagg   900
agaagggcga cgcgcccggg ctcggcttcc tgggcctcga ccggatgcgc gtcctcctgc   960
cgccgctccg cctgccggag aagctgtcgg ccagggcgct gcggacgcac ctcttcacca  1020
actaccggat gcgcaaggtg cgggacagct ccagctggct catcccgctc tgggtcctct  1080
tctgggtgct cctcgcctcc gtcatctgcc tctggatgag caaccaggcc gtcgccaagc  1140
gccgggagtc gctcgccagc atgtgcgacg agcgcgcgcg catgctccag gaccagttca  1200
acgtcagcgt gaaccacctc caggcgctcg ctatcctcgt ctccaccttc caccactcca  1260
agacaccctc cgccatcgac caggtatgta cgtaccccct gctctagtac tgctgtgctg  1320
tcgtagcccc tttccttcct ccaccacata cccgaatcca tgcaagattt ctccaccgtc  1380
ggccgtggcg aaactcatct gtctgaccgt tgccgcagac cacgttcgca aggtacgcgg  1440
agaggacggc gttcgagcgg ccgctcacga gcggggtcgc gtacggggtg cgggtcacgc  1500
acgccgagcg ggagcagttc gagcgccagc agggatggag catcaagaag atgtactcct  1560
ccaagaccaa gaagcagtcg cagggaccag ggaacgctga ggacgccgag gtgcgggagc  1620
cggcggagga gtatgctccc gtaatcttcg cgcaggacgc atacaagcat gtcatctcct  1680
tcgacttgct atccggcgcc gtgagcactc gctctgccct cagcctcccc gccccttcc   1740
ttgcaagatt tcatctttt  cacagagcag gcccacggcc gtaaaaaagc tgcaatcttt  1800
ggtgttcacc atgtgctcac cagtcacagg ccatgatctg ttgctacccc cttttccacc  1860
gtggattttt tgcccttct tttaatcag gggctcaatt actcatggta aaaaaaatca   1920
tgtcaggagc aacaggggct atctatccac taatctttat gcctctttg ctcttccagg   1980
atgaccgcga caacgtactc cgagctagag aatctggaa gggtgttctt actgctcctt   2040
ttaagctgct caataatcgc cttggagtga tctccaccta cgctgtgtac aagtatgagc   2100
ttccccccaaa tgccaggcca caggagcgca ttcaggctgc tatagggtaa gcttttcttg   2160
agtcagacct cctatttcca gtcagtaacc gtgcgactta attactgtcg gccttttttt   2220
tttgtgcaaa tagctactta ggtggcatat ttgacattga agcgcttgtt gacaagttgc   2280
ttcaccagct cgcgggcaag caatccatca tggtgaacgt ttacgatact actaatgata   2340
gacggatcag tatgtatggt tcgaatgata caggcagtgg catgtgccaa gtcagcacac   2400
tgaactttgg tgacccgtca aggaagcatg aaatgcactg caggtgattt gttttctctt   2460
ctaagaaacc tgtaattaaa atgtgttatc cctgtagtct attctttgta aggttctgtg   2520
tctcatctgt ttctctttaa taggttcatt cagagtccac cttggccttg gatggcaata   2580
acgacatcaa ttggaactct tgtgattgct ttactgattg gatacataat ttatgctact   2640
gcaaaacgga ttgccagagt tgaagatgac tttcaggaga tgagtgtgct caaaaagcgt   2700
gcagaggatg cagatattgc caagtcacag gtgaatagct tcgctgcaaa taatagctat   2760
gcatgcttat ttgactgttt ctcttgaagg cgaaaggctt gttctttcct ctctctcttt   2820
tgaggggcca aaaaatggta ccttactacc ttattaattc aatgccttt  ctgcttgcag   2880
ttcttggcta ctgtttctca tgagatcaga actccaatga atggtgttct aggtgaggtt   2940
ctagtccatc taaactgtac aataatctta attgttaatt agagtgaaag agatatgat   3000
gtttccgatt ttgcagggat gctccaaatg ctcatgata ctgatttgga cacaacacaa   3060
caagactatg ttagaaccgc acaagccagt ggcaaagctt tggtatctct catcaatgaa   3120
gtacttgatc aggccaagat cgagtctggt aaacttgagc ttgaagcggt gcccttgac   3180
cttagaacag tttgtgatga cattttgtct ctcttctgtg ggaaagctca ggagaaagga   3240
ctggaggtaa tcaaagacta caaccatgct gtcacacact gcacttttac tgtattttat   3300
tataaatgca ctgactttat tctggtttatt ccttactatg acacacaacg ggagcagctg   3360
gcagtgtttg tttctgacca agttccacaa gcactaattg gcgatcctgg cagaataagg   3420
caaatcatta caaatcttgt cgggaactct ataaagtaa  gacgatcact atatatcgat   3480
agcaggaaat aggataatcc cttgtatatt tatatgcata tatgcatttg ttctttgttg   3540
gctaagagtt ctgtattttt ccacagttca cagagaaggg tcatatctac ttgacagttc   3600
atgttgttga agagattatg aattgtcttg aggtgagac gggaactcag tccgccaata   3660
ccttaagtgg ctacccagtg gcgaacagaa agcgcagttg ggaaaacttt cgagtcttta   3720
gcagggaact gaactcatct gagatgccttt ttgcacccat cgcatcagac tcaataagct   3780
tgataatatc agttgaagat acgggtgttg gaatcccgtt cgatgctcag tcccgtgtct   3840
tcacccctt  catgcaagta ggtccatcca ttgctcgcat ccatggggc  actggcattg   3900
gattaagcat cagcaaatgc ttggttggac tcatgagggg agagattgga tttgcaagta   3960
```

```
aaccccaagt tggttctact ttcaccttca ctgcggttct tacgagggcc cattccagca    4020
gaaatgagaa taaatcgtca gaatttaaag ggatcaatgc attggtggta gatcataggc    4080
cggtccgtgc caaggttact aggtaccatt tacagagact gggagttcag accgaattga    4140
caactgacct agatcaatat atttctaaaa ttaattgcgg atcacaaatt gcaaagcttg    4200
tgctcattga caaagaaacc tggctgaagg aatcccactc tatgcctctt ttggttacta    4260
aattgaggaa caaagatcag ccagactcta caaagttatt tcttttggag acccctaaaa    4320
gtactgccaa aagcaattca catatattca gggaatttaa cttgaatgta attatgaagc    4380
cacttcgagc aagcatgctt caggtttcgc tacacagagc attgggtggg atagataaac    4440
tgcactgcag gaatggagta cttggcaatt caacactggg cagcctttctt cacaagaaac    4500
gaatcttagt ggttgacgac aatattgtaa atctcaaggt tgctgcaggc gctctgaaga    4560
aatatggcgc agaagtaact tgtgctgata gcgggaagaa agcaatcacg caactgaaac    4620
ctcctcacag ttttgatgct tgtttcatgg acatacagat gcctgaaatg gatgggtgag    4680
ttttatcttt gtatattcat catctcacta tactttagac actatctgta cctatatcca    4740
gttgataaac aatacttgct cttgtcaccg atttacattt tcttgttctc ttgtgtcatg    4800
catttggtac cttgcagatt tgaagccaca aaaaggatta gagtgatgga aagagatcta    4860
aatgagcaaa tagaacgtgg agaagcccca ccggaatgcg cagggctccg gcagtggcga    4920
actccaatat tagccatgac agcagatgtt atccaggcga cgcacgaaca gtgcttaaaa    4980
tctgaaatgg acggttatgt atccaagcca ttcgagggcg agcaattgta cagagaagta    5040
gctcgctttt tccaaaatca agaccaagtt cagtaggtag gcttatatgg aggagtgtaa    5100
agtagtggag gatatcgcca acggttcacc cgtcgaggcc gaaagaattt tgtcaaagat    5160
ctcatcttct tgaaagtaag ttctcggctt ctctattttc gtgggagttc atttttccct    5220
agtttcgttt ttttccctgc tgtaaaatat ctggttgttg ttatgcacag agtaaatgag    5280
tagcaacaat tgtgggtcaa ttctttcaaa tggtcaatat catttaagtt ttacatcact    5340
gtcgattcac attgctatac aggtgggcat caattcgcaa agttagaggg cccctattaa    5400
aacactagaa atgctgggat gtggccgcca gttaggtaaa cttactccga atatcactgt    5460
ttaatagaca tgtcaaggct tatattaagc aaaaacaatt cttaaccgat ttaagaatca    5520
aaacggcgct gcttaacaac tatcaagatc taaaaagctt actgttatct tggcaccgcc    5580
ttattttttt gttgaagtta tcggtatgag ttctgaagaa ctgtgacact ttcttgtagc    5640
aagctcatta atcattattt caagttcatg gaacccccct caggtctaat tccatgattc    5700
ttctcattct ttcaggtgga aacgatttag gctggagatg gaaccaccca tgttcggatg    5760
cttggtacat ctgaccaatc tgcaaagcta aatgcgcaat gtcttgaaat caacatgcac    5820
gtgcagctat tcattcgacg atttgctgag gtcaaggcgt gtgaaaaaaa atcagctgca    5880
ttcactaact gcaggtgccc tctgccacta tataatatat aagactaggg ggagaagttt    5940
tccttccccc ggaaggcacg gctgtacata ttatattagg gattggttgg ttgtttgtgc    6000
aggcattttt gtatgcatca tattcggcct gtatgggtcg aagctgtaaa gtgtaaatga    6060
cacattcaaa gatggaagtt ttgtttgaca aaaaaaaaaa acatcagtc                6109
```